(12) United States Patent
Yang et al.

(10) Patent No.: US 7,697,086 B2
(45) Date of Patent: Apr. 13, 2010

(54) CONTAINER, DISPLAY APPARATUS INCLUDING THE SAME, AND METHOD OF MANUFACTURING DISPLAY APPARATUS

(75) Inventors: Yong-seok Yang, Asan-si (KR); Jin-ho Ha, Suwon-si (KR); Yoon-soo Kwon, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 146 days.

(21) Appl. No.: 11/930,650

(22) Filed: Oct. 31, 2007

(65) Prior Publication Data

US 2008/0100768 A1 May 1, 2008

(30) Foreign Application Priority Data

Nov. 1, 2006 (KR) .................. 10-2006-0107336

(51) Int. Cl.
*G02F 1/1333* (2006.01)
(52) U.S. Cl. ........................................ 349/58
(58) Field of Classification Search ........... None
See application file for complete search history.

(56) References Cited

U.S. PATENT DOCUMENTS

| | | | |
|---|---|---|---|
| 6,522,371 B1* | 2/2003 | Sakamoto et al. | 349/58 |
| 7,178,967 B2* | 2/2007 | Kim | 362/633 |
| 2002/0135294 A1* | 9/2002 | Fujishiro et al. | 313/493 |
| 2005/0168954 A1* | 8/2005 | Kim | 361/725 |
| 2005/0252148 A1* | 11/2005 | Lin et al. | 52/633 |
| 2006/0066768 A1* | 3/2006 | Lee et al. | 349/58 |
| 2006/0290833 A1* | 12/2006 | Park | 349/58 |

FOREIGN PATENT DOCUMENTS

| | | | |
|---|---|---|---|
| JP | 2000-39850 A | * | 2/2000 |
| JP | 2000-314872 A | * | 11/2000 |
| KR | 1020010064891 A | | 7/2001 |

* cited by examiner

*Primary Examiner*—Mike Stahl
(74) *Attorney, Agent, or Firm*—Cantor Colburn LLP

(57) ABSTRACT

A container that is capable of being easily assembled and conveyed while production cost and production time are reduced includes a plurality of division parts having walls and upper portions, and first fitting members formed at ends of the division parts to fit adjacent division parts to each other. A display apparatus including the container and a method of manufacturing the display apparatus are further provided.

18 Claims, 6 Drawing Sheets

CONTAINER, DISPLAY APPARATUS INCLUDING THE SAME, AND METHOD OF MANUFACTURING DISPLAY APPARATUS

This application claims priority to Korean Patent Application No. 10-2006-0107336, filed on Nov. 1, 2006, and all the benefits accruing therefrom under 35 U.S.C. §119, the contents of which in its entirety are herein incorporated by reference.

BACKGROUND OF THE INVENTION

1. Field of the Invention

The present invention relates to a container, a display apparatus including the same, and a method of manufacturing the same, and, more particularly, to a container that is capable of being easily assembled and conveyed at low production cost and reduced production time, a display apparatus including the same, and a method of manufacturing the same.

2. Description of the Related Art

Currently, among display apparatuses, a liquid crystal display ("LCD") is one of the most extensively used flat panel displays. The LCD is provided with two substrates on which electrodes are formed, and a liquid crystal layer that is interposed between the substrates. In the LCD, voltages are applied to the electrodes to rearrange liquid crystal molecules of the liquid crystal layer, thereby controlling the quantity of transmitted light.

A plurality of elements such as a liquid crystal panel, a diffusion plate, and a reflection sheet are required in the LCD. The elements may be contained in a container, for example, a top chassis, a bottom chassis, or a mold frame, to constitute the LCD. In connection with this, the container may be produced using, for example, a press process.

Currently, the demand for LCDs is rapidly growing, causing mass production of the LCDs. Accordingly, simplification, lightness and slimness, and reduced production cost of the LCDs are in demand. However, in the case of the container that is produced using a known press process, since many molds are used to produce the container, the production cost and the production time are increased. Thus, the container is undesirable to satisfy the above demand.

Additionally, the size of the container is increased in accordance with enlargement of the LCD. Therefore, there are problems in that it is difficult to convey the container and conveying cost is increased.

BRIEF SUMMARY OF THE INVENTION

The present invention provides a container that is capable of being easily assembled and conveyed while production cost and production time are reduced.

The present invention also provides a display apparatus that includes the container.

The present invention also provides a method of manufacturing the display apparatus.

According to exemplary embodiments of the present invention, a container includes a plurality of division parts having walls and upper portions, and first fitting members formed at ends of the division parts to fit adjacent division parts to each other.

According to other exemplary embodiments of the present invention, a display apparatus includes a panel that displays image information, a lower container receiving the panel, and an upper container fitted to the lower container to receive the panel and to expose a display region of the panel. The upper container includes a plurality of division parts having walls and upper portions, and first fitting members formed at ends of the division parts to fit adjacent division parts to each other.

According to still other exemplary embodiments of the present invention, a method of manufacturing a display apparatus includes providing a display panel to display image information thereon, the display panel having a plurality of pixel regions, disposing the display panel within a lower container, assembling an upper container, including providing a plurality of division parts each having a wall, an upper portion, and a fitting member formed at each end of each division part, and adjoining adjacent division parts together by fitting the fitting members together, and fitting the upper container to the lower container to receive the display panel there between and to expose a display region of the display panel through the upper container.

Details of other exemplary embodiments are included in the detailed description and drawings.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
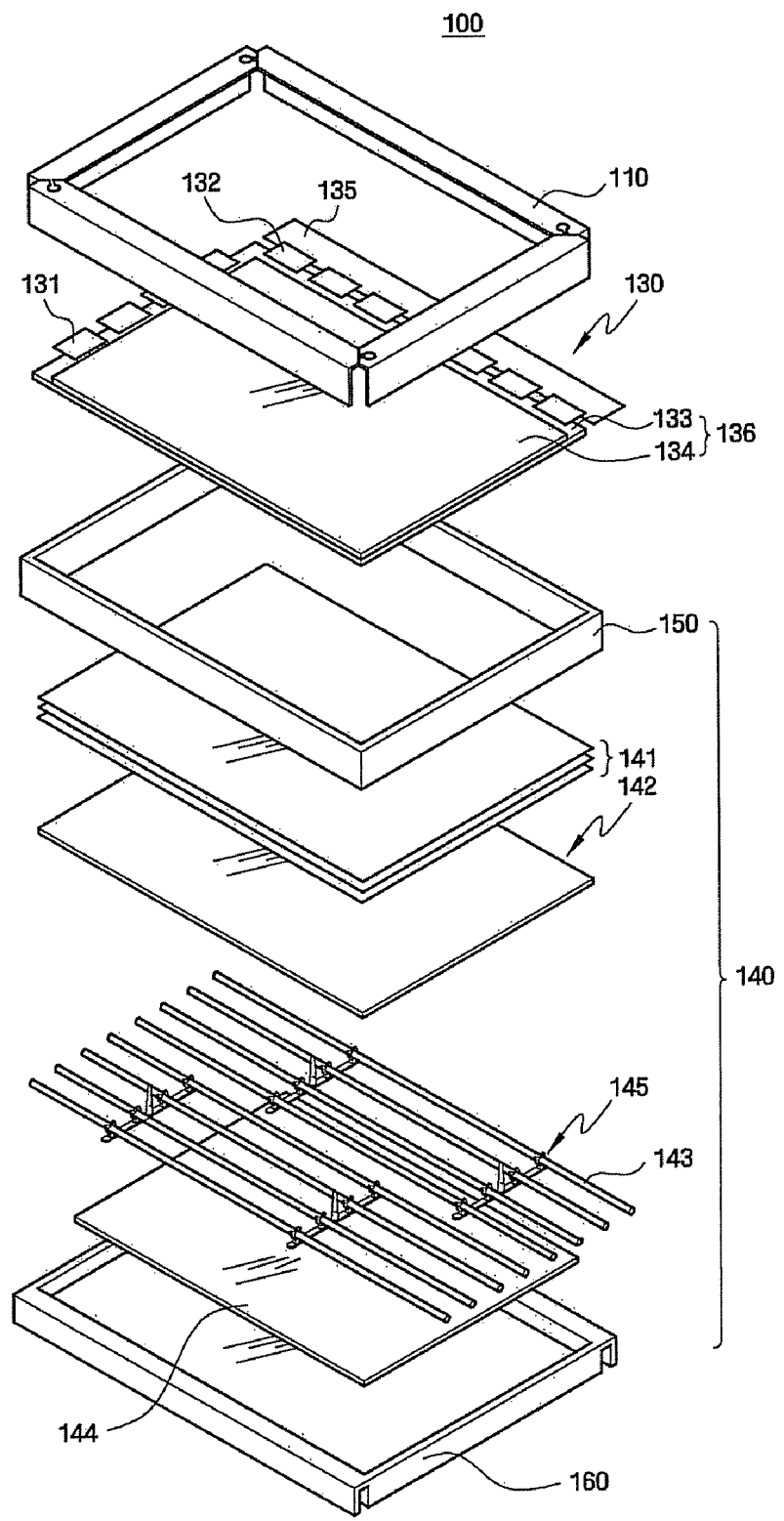
FIG. 1 is an exploded perspective view of an exemplary liquid crystal display ("LCD") according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the size and the relative size of layers and regions may be exaggerated for clarity.

It will be understood that when an element or layer is referred to as being "on" another element or layer, it can be directly on the other element or layer or intervening elements or layers may be present. In contrast, when an element is referred to as being "directly on" another element or layer, there are no intervening elements or layers present. Like reference numerals refer to like elements throughout the specification. The term "and/or" includes any and all combinations of one or more of the associated listed items.

Spatially relative terms, such as "below", "beneath", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

The present invention will be described with reference to schematic perspective views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in the manufacturing processes. Thus, regions shown in the drawings are illustrated in schematic form and the shapes of the regions are presented simply by way of illustration and not as a limitation.

Hereinafter, exemplary embodiments according to the present invention will be described in detail with reference to the accompanying drawings.

A display apparatus that is used in the present invention may be extensively applied to liquid crystal displays ("LCDs"), plasma display panel ("PDP") apparatuses, organic light emitting diode ("OLED") apparatuses, and field emission display ("FED") apparatuses in which light is emitted through pixels having the lattice pattern. For the convenience of description, an LCD and a container that is used in the LCD according to the present invention will now be described. However, the present invention is not limited thereto, but may be applied to the above-mentioned various types of display apparatuses and containers used in the display apparatuses.

Hereinafter, a container and an LCD including the same according to an exemplary embodiment of the present invention will be described in detail with reference to FIGS. 1 to 5.

FIG. 1 is an exploded perspective view of the exemplary LCD according to an exemplary embodiment of the present invention. With reference to FIG. 1, an LCD 100 is provided with a liquid crystal panel assembly 130 that displays image information, a backlight assembly 140 that provides light to the liquid crystal panel assembly 130, and an upper container 110 that is combined with the backlight assembly 140 to receive the liquid crystal panel assembly 130 therein.

The liquid crystal panel assembly 130 includes a liquid crystal panel 136 that includes a common electrode display panel 134 and a thin film transistor ("TFT") display panel 133, liquid crystal (not shown), a gate tape carrier package ("TCP") 131, a data TCP 132, and a printed circuit board ("PCB") 135.

The liquid crystal panel 136 includes the TFT display panel 133 that has gate lines (not shown), data lines (not shown), a TFT array, and pixel electrodes, and the common electrode display panel 134 that has a black matrix and a common electrode and is disposed to face the TFT display panel 133.

Additionally, the gate TCP 131 is connected to the gate lines (not shown) that are formed in the TFT display panel 133, and the data TCP 132 is connected to the data lines (not shown) that are formed in the TFT display panel 133.

Meanwhile, a plurality of driving parts is mounted on the PCB 135 to treat both gate driving signal and data driving signal so that the gate driving signal is capable of being inputted in the gate TCP 131 and the data driving signal is capable of being inputted in the data TCP 132.

Additionally, the backlight assembly 140 includes optical sheets 141, a diffusion plate 142, lamps 143, a reflection plate 144, and a receiving frame 150 and a lower container 160 that receive the optical sheets 141, the diffusion plate 142, the lamp 143, and the reflection plate 144.

A cold cathode fluorescent lamp ("CCFL") or an external electrode fluorescent lamp ("EEFL") may be used as each lamp 143. The lamps 143 emit light by lamp driving voltage that is applied to the lamps 143 from the outside. Furthermore, the lamps 143 may be disposed in parallel at regular intervals so as to have the same height, and may be a direct type, providing light directly to a rear of diffusion plate 142. In order to assure uniform distribution of discharged gas in the lamp 143 so that uniform brightness is obtained, it is preferable that the lamps 143 be longitudinally disposed with respect to the liquid crystal panel 136. Lamp sockets (not shown) may be formed at ends of the lamps 143 to apply the lamp driving voltage to the lamps 143 and to support and fix the lamps 143. Alternatively, a light emitting diode ("LED") may be used as the lamp 143.

The reflection plate 144 is provided under the lamps 143 to reflect any light that is emitted downward from the lamps 143, back upward. The reflection plate 144 may be produced by dispersing a white pigment such as titanium oxide in a sheet that is made of a synthetic resin material or by forming bubbles in the material to scatter light. Alternatively, the reflection plate 144 may be integrally formed on the bottom of the lower container 160. That is, the lower container 160 may be made of a substance having high reflectivity such as aluminum (Al) or an aluminum alloy so as to have a function of the reflection plate 144.

The lamps 143 may be fixed by means of lamp fixing units 145 that are disposed on the reflection plate 144 to maintain appropriate spacing and positioning of the lamps 143.

The diffusion plate 142 may be provided on the lamps 143 and diffuses light that is emitted from the lamps 143 so as to improve uniformity in the brightness of light. The diffusion plate 142 is formed of a transparent resin layer to which a diffusing agent is added. In connection with this, examples of the diffusing agent may include a silicon diffusing agent, a magnesium diffusing agent, or a calcium oxide diffusing agent. Additionally, the transparent resin layer may include polymethyl methacrylate ("PMMA"), methyl styrene ("MS"), polystyrene ("PS"), or polycarbonate ("PC").

Additionally, the optical sheets 141 are provided on the diffusion plate 142 to diffuse or concentrate light that is emitted from the lamps 143. The optical sheets 141 may include, for example, a diffusion sheet, a first prism sheet, and a second prism sheet.

The diffusion sheet of the optical sheets 141 is provided on the lamps 143 to improve brightness and uniformity in the brightness of light that is emitted from the lamps 143.

The first prism sheet of the optical sheets 141 is provided on the diffusion sheet. Prism patterns having a triangular prism shape (not shown) may be formed at regular intervals on a side of the first prism sheet to concentrate light that is diffused from the diffusion sheet and to emit concentrated light. For example, a brightness enhancement film may be used as the first prism sheet.

The second prism sheet of the optical sheets 141 is provided on an upper portion of the first prism sheet. The second prism sheet may be a reflection type of polarization prism sheet that has a multilayer structure and concentrates and polarizes light. For example, a dual brightness enhancement film may be used as the second prism sheet. However, if the brightness and the viewing angle are desirably assured using only the first prism sheet, then the use of the second prism sheet may be omitted.

While particular examples of the optical sheets 141 have been described, the type of optical sheets 141 may vary depending on the structure of the backlight assembly 140. That is, other arrangements and sheets within the optical sheets 141 would also be within the scope of these embodiments.

The reflection plate 144, the lamps 143, the diffusion plate 142, and the optical sheets 141 are sequentially contained in the lower container 160, and the receiving frame 150 is moved downward to combine with the lower container 160. The liquid crystal panel 136 is disposed on the optical sheet 141 and the liquid crystal panel 136 is supported by the receiving frame 150. The receiving frame 150 includes walls that are formed along the edge of a rectangle. Stepped portions or protrusions (not shown) may be formed on internal sides of the walls of the receiving frame 150 to support the liquid crystal panel assembly 130.

The lower container 160 has a rectangular shape, and walls are formed along the edge of an upper portion of the lower container 160. The reflection plate 144, the lamps 143, the diffusion plate 142, and the optical sheets 141 are contained in the lower container 160 and fixed by the walls.

Additionally, the lamp fixing units 145 support the diffusion plate 142 and the optical sheets 141, in addition to fixing the lamps 143, thereby preventing the diffusion plate 145 and the optical sheets 141 from bending. Each lamp fixing unit 145 is provided with a plate that is disposed on the reflection plate 144, a grip portion that is formed on the plate to fix at least one of the lamps 143, and a support portion that is formed on the plate to support the diffusion plate 142. A fixing hook (not shown) is formed on the bottom of the plate so that the fixing hook is combined with an opening (not shown) formed on the bottom of the lower container 160 while the fixing hook is formed through the reflection plate 144, thereby combining the lamp fixing units 145 with the lower container 160.

Additionally, the PCB 135 of the liquid crystal panel assembly 130 is bent along the walls of the lower container 160 and mounted on the wall or the rear side of the lower container 160. In connection with this, the shape of the lower container 160 may vary according to the method of receiving the optical sheets 141, the diffusion plate 142, the lamps 143, and the reflection plate 144 into the lower container 160.

Furthermore, the upper container 110 is combined with the lower container 160 so as to cover a peripheral section of the upper portion of the liquid crystal panel 136 that is disposed on the receiving frame 150. The upper container 110 may cover a non-display region of the liquid crystal panel 136. A window is formed in the upper portion of the upper container 110 to expose a display region of the liquid crystal panel 136. The upper container 110 may be fitted to the lower container 160 by using a hook (not shown) or a screw (not shown). As will be further described below, the upper container 110 may be a division type which is useful to the liquid crystal panel 136 having the large area so that assembling and conveying are easily performed.

Figure 2:
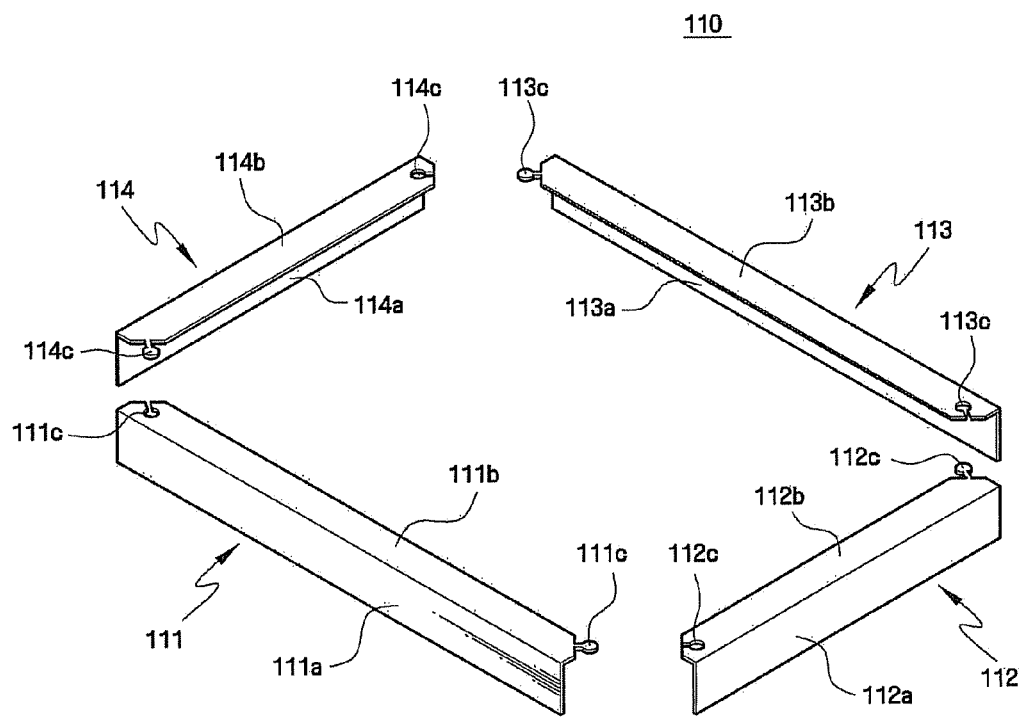
FIG. 2 is an exploded perspective view of an upper container that is included in the exemplary LCD of FIG. 1.
Figure 3:
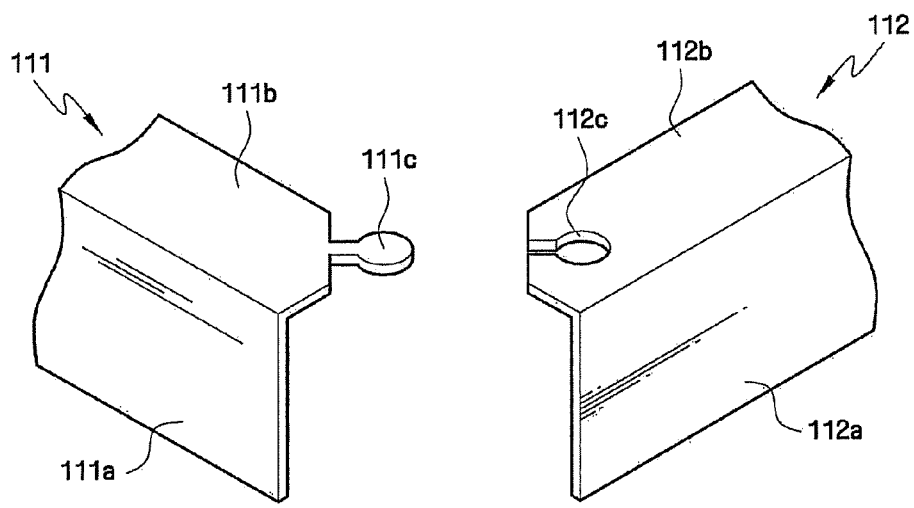
FIG. 3 is a perspective view of an enlarged portion of the exemplary upper container of FIG. 2.
Figure 4:
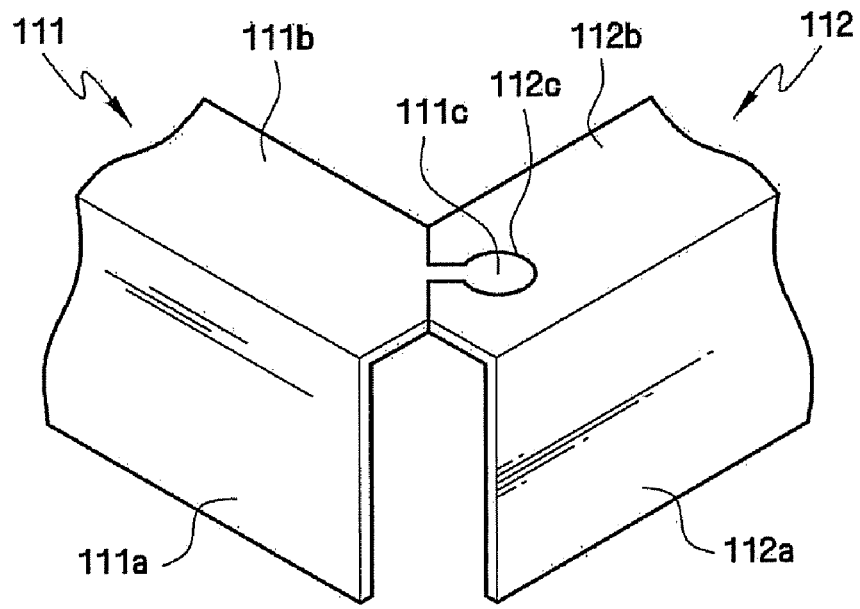
FIG. 4 is a perspective view of an enlarged portion of the assembled exemplary upper container of FIG. 3.
Figure 5:
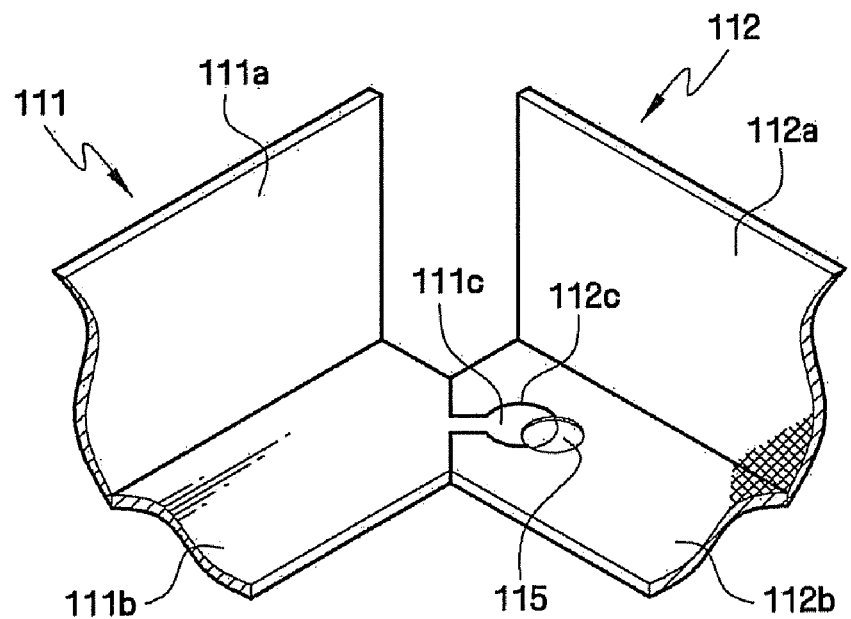
FIG. 5 is a perspective view of an enlarged portion of a rear side of the exemplary upper container of FIG. 4.

Hereinafter, the upper container according to exemplary embodiments of the present invention will be described with reference to FIGS. 2 to 5. In connection with this, FIG. 2 is an exploded perspective view of the exemplary upper container that is included in the exemplary LCD of FIG. 1. FIG. 3 is a perspective view of an enlarged portion of the exemplary upper container of FIG. 2. FIG. 4 is a perspective view of an enlarged portion of the exemplary assembled upper container of FIG. 3. FIG. 5 is a perspective view of an enlarged portion of a rear side of the exemplary upper container of FIG. 4.

With reference to FIGS. 2 to 4, the upper container 110 according to an exemplary embodiment of the present invention includes an assembly having first through fourth division parts 111, 112, 113, and 114. If the LCD is large, the upper container 110 is correspondingly large. With respect to this, since the division type of upper container 110 is used, in the case of when the upper container 110 is to be conveyed, the upper container is conveyed while the upper container is divided into the division parts 111, 112, 113, and 114, and then the division parts 111, 112, 113, and 114 are assembled.

Thereby, conveying cost is reduced. In other words, the method of manufacturing the upper container 110 includes separately forming the division parts 111, 112, 113, and 114, and then assembling the division parts 111, 112, 113, and 114 together to form the upper container 110.

The division parts 111, 112, 113, and 114 include walls 111a, 112a, 113a, and 114a and upper portions 111b, 112b, 113b, and 114b, respectively, that are connected to each other, and have an "L" shaped cross section. The division parts 111, 112, 113, and 114 may be made of a metal material, for example, SUS stainless steel, and produced by using an extrusion molding process. When the division parts 111, 112, 113, and 114 are formed using the extrusion molding process, the process time and the process cost may be reduced in comparison with a press process. In addition, since it is not necessary to produce an additional mold, production cost of the mold may be reduced.

Also, when the division parts 111, 112, 113, and 114 are produced using the extrusion molding process, the division parts 111, 112, 113, and 114 are formed so that the sections of the division parts 111, 112, 113, and 114 have substantially the same shape and the division parts 111, 112, 113, and 114 have substantially the same thickness. In order to provide varying rectangular shapes, the first and third division parts 111 and 113 may be extruded to have a different length than the second and fourth division parts 112 and 114.

The adjacent division parts 111, 112, 113, and 114 may be fitted to each other to form the upper container 110. To be more specific, first or horizontal fitting members 111c, 112c, 113c, and 114c are formed at ends of the upper portions 111b, 112b, 113b, and 114b of the division parts 111, 112, 113, and 114. That is, the first, the second, the third, and the fourth division parts 111, 112, 113, and 114 include the first, the second, the third, and the fourth walls 111a, 112a, 113a, and 114a, and the first, the second, the third, and the fourth upper portions 111b, 112b, 113b, and 114b, and the first, the second, the third, and the fourth horizontal fitting members 111c, 112c, 113c, and 114c are formed at each end of the first, the second, the third, and the fourth upper portions 111b, 112b, 113b, and 114b.

The horizontal fitting members 111c, 112c, 113c, and 114c that are formed in the adjacent division parts 111, 112, 113, and 114, respectively, form protrusions and grooves so as to be fitted to each other. Each adjacent division part 111, 112, 113, and 114 may include one horizontal fitting member 111c, 112c, 113c, and 114c having a protrusion shape at a first end thereof and one horizontal fitting member 111c, 112c, 113c, and 114c having a groove shape at a second end thereof, opposite the first end. For example, the first horizontal fitting members 111c that are formed at both ends of the first division part 111 are fitted to the second horizontal fitting member 112c of the second division part 112 and the fourth horizontal fitting member 114c of the fourth division part 114. In addition, the third horizontal fitting members 113c that are formed at both ends of the third division part 113 are fitted to the second horizontal fitting member 112c of the second division part 112 and the fourth horizontal fitting member 114c of the fourth division part 114. Thus, the horizontal (first) fitting members 111c, 112c, 113c, and 114c fit adjacent division parts 111, 112, 113, and 114 to each other in a horizontal (first) direction.

The ends of the protrusions or the grooves that constitute the horizontal fitting members 111c, 112c, 113c, and 114c may have a large area or may be bent so as to prevent the horizontal fitting members 111c, 112c, 113c, and 114c from being horizontally separated from each other after they are fitted to each other. While the horizontal fitting members 111c, 112c, 113c, and 114c are illustrated as having a circular shape, the horizontal fitting members 111c, 112c, 113c, and 114c may alternatively have any shape as long as they are not horizontally separated from each other.

As shown in FIG. 5, after the division parts 111, 112, 113, and 114 are fitted to each other by means of the horizontal fitting members 111c, 112c, 113c, and 114c, caulking grooves 115 may be formed at joints of the horizontal fitting members 111c, 112c, 113c, and 114c, such as by a punch or a chisel, so as to increase fitting strength. The caulking grooves 115 are formed at the joints of the horizontal fitting members 111c, 112c, 113c, and 114c to physically deform the joints, thereby preventing the division parts 111, 112, 113, and 114 from being separated from each other. As illustrated, the caulking grooves 115 may be formed on internal surfaces of the upper portions 111b, 112b, 113b, and 114b in order to assure a good appearance of the upper container 110. However, the present invention is not limited thereto, and the caulking grooves 115 may alternatively be formed on external surfaces of the upper portions 111b, 112b, 113b, and 114b.

Figure 6:
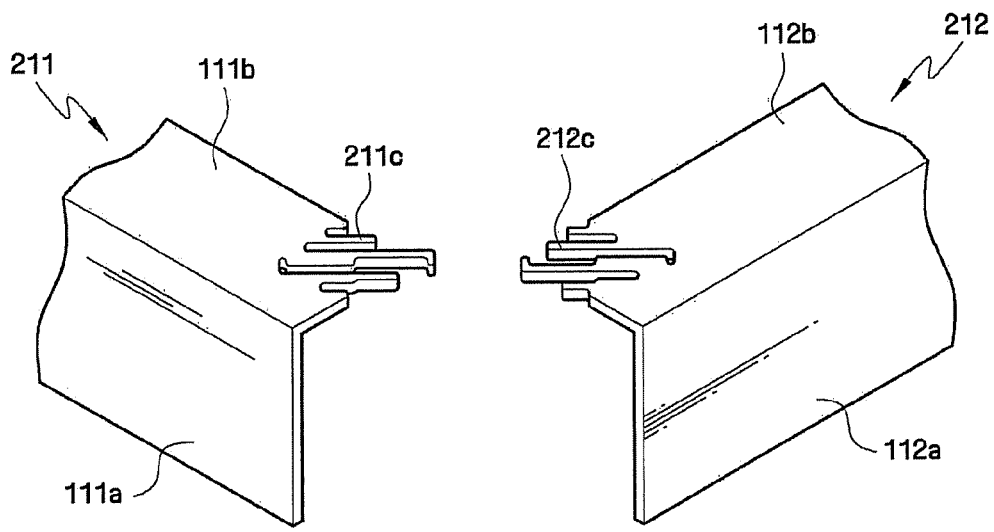
FIG. 6 is a perspective view of an enlarged portion of an exemplary upper container according to another exemplary embodiment of the present invention.
Figure 7:
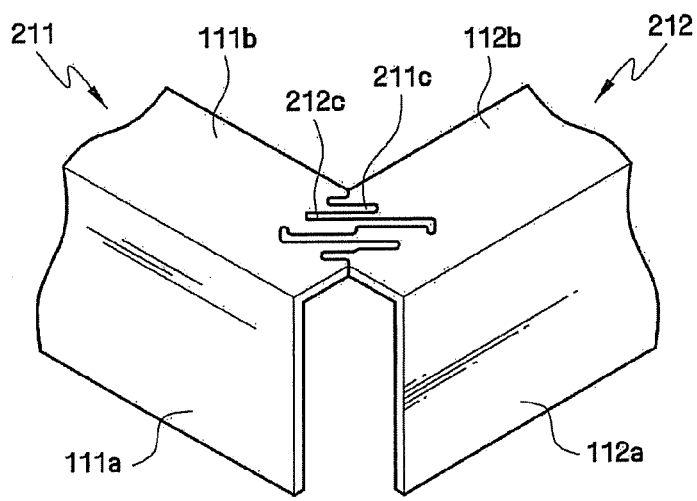
FIG. 7 is a perspective view of an enlarged portion of the assembled exemplary upper container of FIG. 6.
Figure 8:
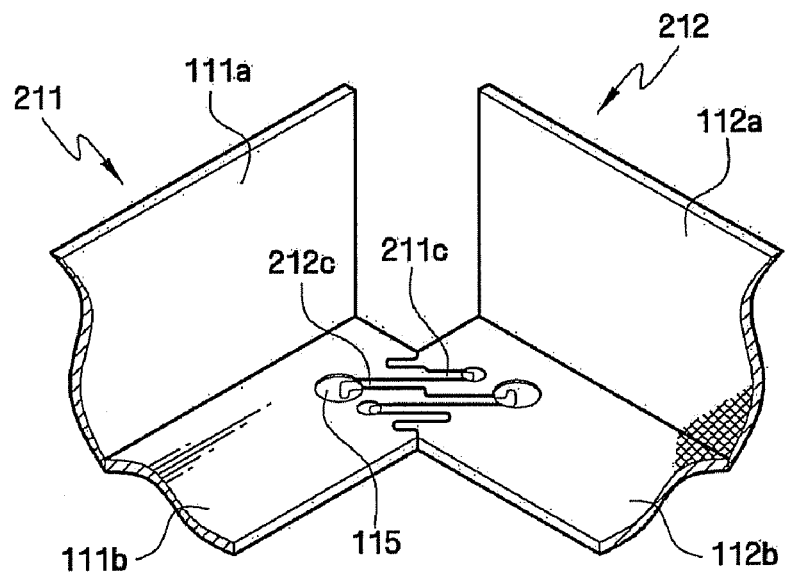
FIG. 8 is a perspective view of an enlarged portion of a rear side of the exemplary upper container of FIG. 6.

Hereinafter, an upper container according to other exemplary embodiments of the present invention will be described with reference to FIGS. 6 to 8. In connection with this, FIG. 6 is a perspective view of an enlarged portion of the exemplary upper container according to another exemplary embodiment of the present invention. FIG. 7 is a perspective view of an enlarged portion of the exemplary assembled upper container of FIG. 6, and FIG. 8 is a perspective view of an enlarged portion of a rear side of the exemplary upper container of FIG. 6. For the convenience of description, the members that have the same or substantially the same function as the members shown in FIGS. 1 to 5 of the former embodiment are referred to with the same reference numerals, and the description thereof will be omitted.

As shown in FIGS. 6 and 7, first and second horizontal (first) fitting members 211c and 212c that are formed in first and second division parts 211 and 212, respectively, constituting one section of the upper container, may include a plurality of protrusions or grooves. That is, instead of the horizontal fitting members merely including a single protrusion or a single groove as in the prior embodiment, the horizontal fitting members 211c, 212c each include at least one protrusion and at least one groove, such as each including a plurality of protrusions and a plurality of grooves. Thereby, the fitting strength of the joints of the first and the second horizontal fitting members 211c and 212c may be improved.

As shown in FIG. 8, after the first and the second division parts 211 and 212 are fitted to each other by the first and the second horizontal fitting members 211c and 212c, caulking grooves 115 may be formed at joints of the first and the second horizontal fitting members 211c and 212c, such as by a punch or a chisel, so as to increase fitting strength. The caulking grooves 115 are formed at the joints of the first and the second horizontal fitting members 211c and 212c to physically deform the joints, thereby preventing the first and the second division parts 211 and 212 from being separated from each other. The caulking grooves 115 may be formed on internal surfaces of the upper portions 111a and 112b in order to assure a good appearance of the upper container 110. However, the present invention is not limited thereto, and the caulking grooves 115 may alternatively be formed on external surfaces of the upper portions 111b and 112b.

Although not shown, it should be understood that the above horizontal fitting members 211c and 212c and caulking grooves 115 may also be applied to opposite ends of the first and second division parts 211, 212, and also to third and fourth division parts that constitute the upper container.

Figure 9:
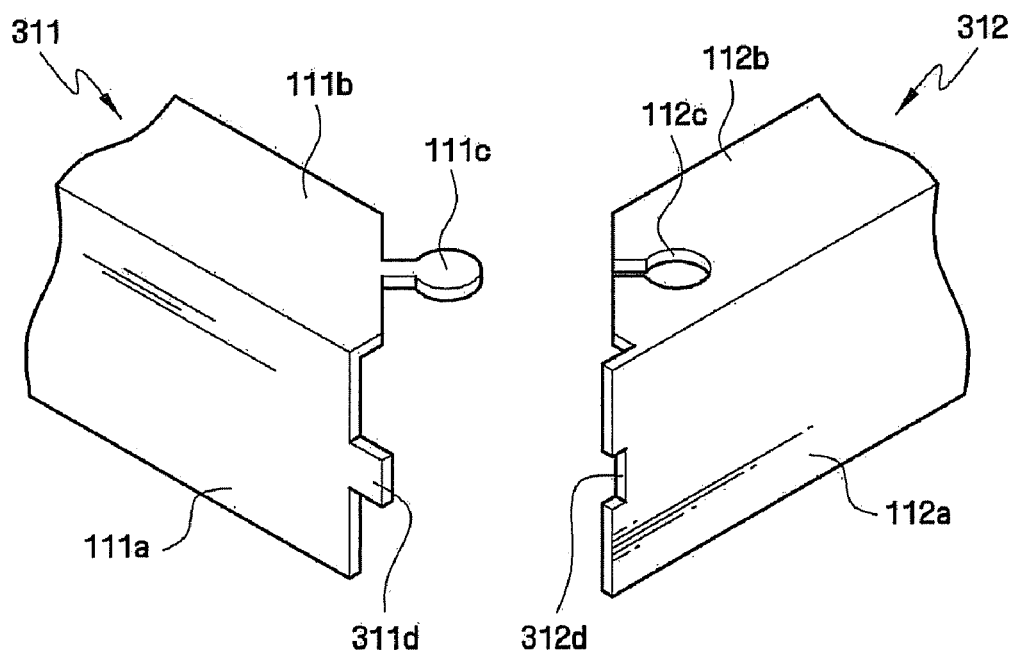
FIG. 9 is a perspective view of an enlarged portion of an exemplary upper container according to still another exemplary embodiment of the present invention.
Figure 10:
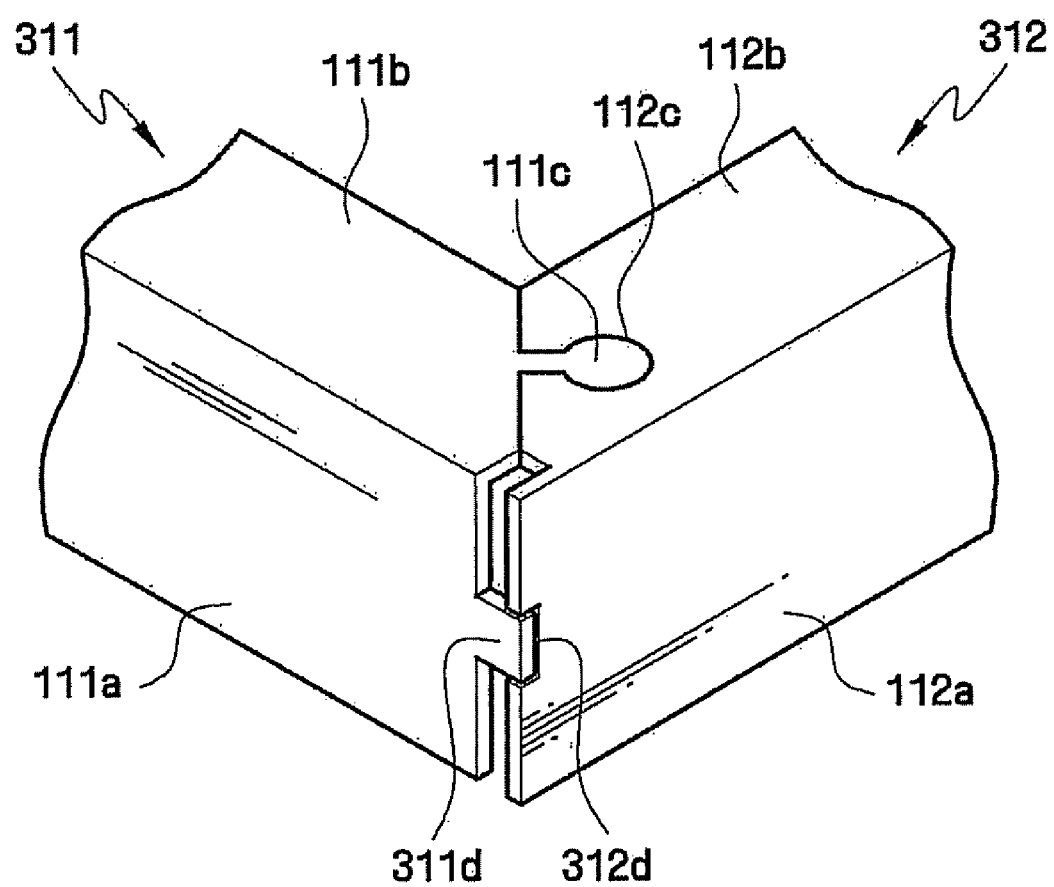
FIG. 10 is a perspective view of an enlarged portion of the assembled exemplary upper container of FIG. 9.

Hereinafter, an upper container according to still other exemplary embodiments of the present invention will be described with reference to FIGS. 9 and 10. In connection with this, FIG. 9 is a perspective view of an enlarged portion of an exemplary upper container according to still another exemplary embodiment of the present invention, and FIG. 10 is a perspective view of an enlarged portion of the exemplary assembled upper container of FIG. 9. For the convenience of description, the members that have the same function as the members shown in FIGS. 1 to 5 of the above-described exemplary embodiments are referred to with the same reference numerals, and the description thereof will be omitted.

As shown in FIGS. 9 and 10, first and second division parts 311 and 312 may include first and second vertical (second) fitting members 311d and 312d so as to improve fitting strength, respectively. In the illustrated embodiment, the first and second vertical (second) fitting members 311d, 312d are provided in addition to horizontal (first) fitting members 111c, 112c. Alternatively, the horizontal fitting members of the first and second division parts 311, 312 may be horizontal fitting members 211c, 212c that each have at least one protrusion and at least one groove.

The first and the second vertical fitting members 311d and 312d are formed at ends of first and second walls 111a and 112a of the first and the second division parts 311 and 312, respectively. The first and the second vertical fitting members 311d and 312d have a protrusion or groove shape so as to be fitted to each other.

Although the vertical fitting members 311d and 312d are illustrated as having rectangular profiles, the vertical fitting members 311d and 312d may alternatively have any shape as long as the vertical fitting members 311d and 312d are not separated from each other in a vertical (second) direction after the vertical fitting members 311d and 312d are fitted to each other. Also, the vertical fitting members 311d, 312d may each be provided with a plurality of protrusions and grooves for improving the joint between the first and second division parts 311, 312.

Although not shown, the above-mentioned vertical fitting members 311d and 312d may also be applied to opposite ends of the first and second division parts 311, 312, as well as third and fourth division parts that constitute the upper container.

The LCDs according to the exemplary embodiments of the present invention may be include a direct type of backlight assembly that does not include a light guide plate but a plurality of lamps arranged on the bottom thereof. The LCDs may alternatively include an edge type of backlight assembly that includes a lamp provided on a side of a light guide plate.

Examples of the edge type of backlight assembly may include a wedge type of backlight assembly that includes a lamp assembly provided on a side of a light guide plate, and a flat type of backlight assembly that includes lamp assemblies provided on opposing sides of a flat light guide plate.

In view of the above-described exemplary embodiments of the upper container, a method of manufacturing the display apparatus may include, in part, providing a display panel to display image information thereon, the display panel having a plurality of pixel regions, disposing the display panel within a lower container, assembling an upper container, including providing a plurality of division parts each having a wall, an upper portion, and a fitting member formed at each end of each division part, and adjoining adjacent division parts together by fitting the fitting members together, and fitting the upper container to the lower container to receive the display panel there between and to expose a display region of the display panel through the upper container. The method may also include using extrusion molding to extrude four division parts, where sections of the division parts have a substantially same shape and a substantially same thickness. The method may also include forming a caulking groove at joints of the fitting members to improve fitting strength between the fitting members.

As described above, the container and the display apparatus including the same according to the present invention are advantageous in that, since a division type of container is provided in the display apparatus, conveying cost is reduced.

In addition, the division parts that constitute the division type of container are produced by an extrusion molding process, thereby reducing the process time and the process cost. Unlike a press process, since it is not necessary to produce an additional mold in the case of the extrusion molding process, it is possible to reduce the production cost of the mold. Furthermore, the horizontal fitting member or the vertical fitting member is used to easily and effectively fit the division parts to each other.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A container for a display apparatus, comprising:
   a plurality of division parts including walls and upper portions;
   horizontal fitting members formed at ends of the division parts and fitting adjacent division parts to each other; and
   caulking grooves formed at joints of the horizontal fitting members, which improve a fitting strength between the horizontal fitting members,
   wherein the horizontal fitting members are parallel to the upper portions.

2. The container of claim 1, wherein the horizontal fitting members are formed at ends of the upper portions and fit the adjacent division parts to each other in a horizontal direction.

3. The container of claim 2, wherein the horizontal fitting members formed in the adjacent division parts each comprise at least one of a protrusion or groove so as to be fitted to each other.

4. The container of claim 1, wherein the division parts are formed by extrusion molding and sections of the division parts have a substantially same shape and a substantially same thickness.

5. The container of claim 1, further comprising:
   vertical fitting members formed at ends of the walls and fitting the adjacent division parts to each other in a vertical direction.

6. The container of claim 5, wherein the vertical fitting members formed in the adjacent division parts each comprise at least one of a protrusion or groove so as to be fitted to each other.

7. The container of claim 1, wherein the caulking grooves are formed on internal surfaces of the upper portions.

8. A display apparatus comprising:
   a panel, which displays image information;
   a lower container receiving the panel;
   an upper container fitted to the lower container, receiving the panel and exposing a display region of the panel,
   wherein the upper container includes a plurality of division parts having walls, upper portions and horizontal fitting members formed at ends of the division parts, the horizontal fitting members fitting adjacent division parts to each other and disposed parallel to the upper portions, and
   caulking grooves formed at joints of the horizontal fitting members, which improve a fitting strength between the horizontal fitting members.

9. The display apparatus of claim 8, wherein the horizontal fitting members are formed at ends of the upper portions and fit the adjacent division parts to each other in a horizontal direction.

10. The display apparatus of claim 9, wherein the horizontal fitting members formed in the adjacent division parts each comprise at least one of a protrusion or groove so as to be fitted to each other.

11. The display apparatus of claim 10, wherein ends of the horizontal fitting members are formed to have a large area or be bent.

12. The display apparatus of claim 8, wherein the division parts are formed by extrusion molding and sections of the division parts have a substantially same shape and a substantially same thickness.

13. The display apparatus of claim 8, further comprising:
   vertical fitting members formed at ends of the walls and fitting the adjacent division parts to each other in a vertical direction.

14. The display apparatus of claim 13, wherein the vertical fitting members formed in the adjacent division parts each comprise at least one of a protrusion or groove so as to be fitted to each other.

15. The display apparatus of claim 8, wherein the caulking grooves are formed on internal surfaces of the upper portions.

16. A method of manufacturing a display apparatus, the method comprising:
   providing a display panel, which displays image information, the display panel having a plurality of pixel regions;
   disposing the display panel within a lower container;
   assembling an upper container, including providing a plurality of division parts each having a wall, an upper portion and a fitting member formed at each end of each division part;
   adjoining adjacent division parts together by fitting the fitting members together;
   forming a caulking groove at joints of the fitting members, the caulking groove improving a fitting strength between the fitting members; and
   fitting the upper container to the lower container, thereby receiving the display panel there between and exposing a display region of the display panel through the upper container,
   wherein the fitting member is parallel to each division part.

17. The method of claim 16, wherein providing the plurality of division parts includes using extrusion molding to extrude four division parts, and sections of the division parts have a substantially same shape and a substantially same thickness.

18. The container of claim 1, wherein the horizontal fitting members are coplanar with the upper portions.

* * * * *